Dec. 20, 1955 C. E. EVANS 2,727,319
TOOTH FOR DIGGER BUCKET
Filed March 27, 1951 3 Sheets-Sheet 1
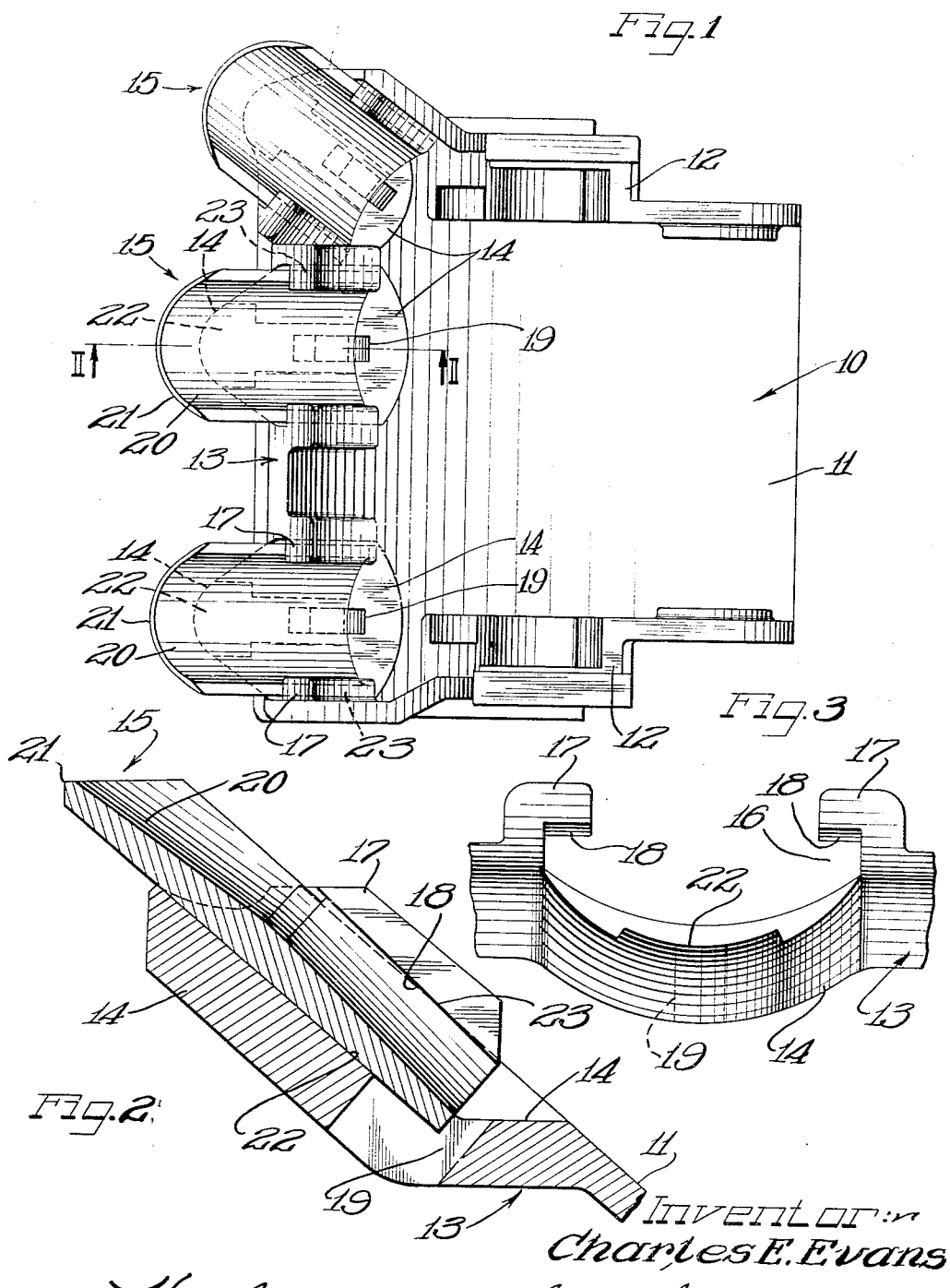
Inventor:
Charles E. Evans

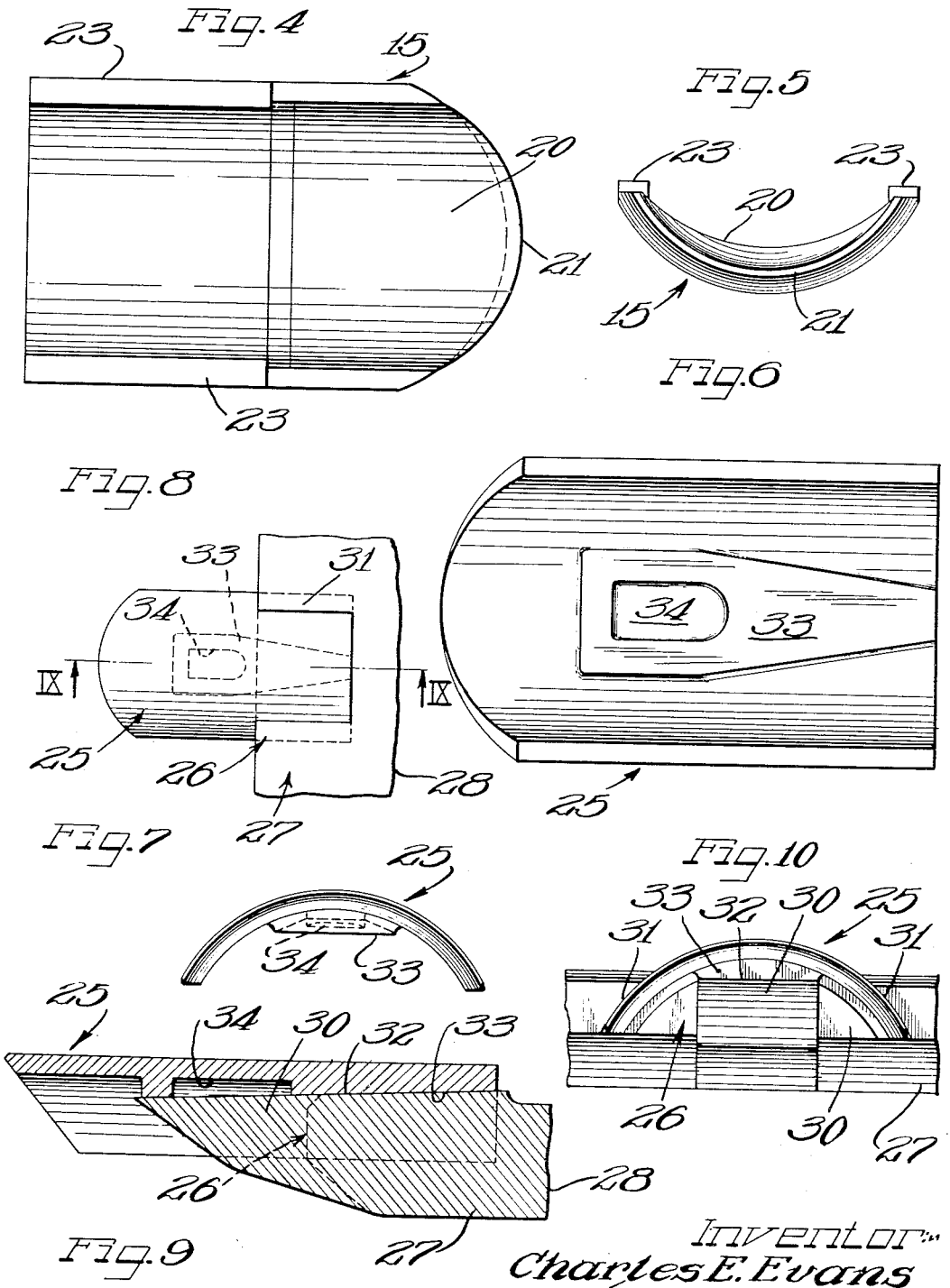

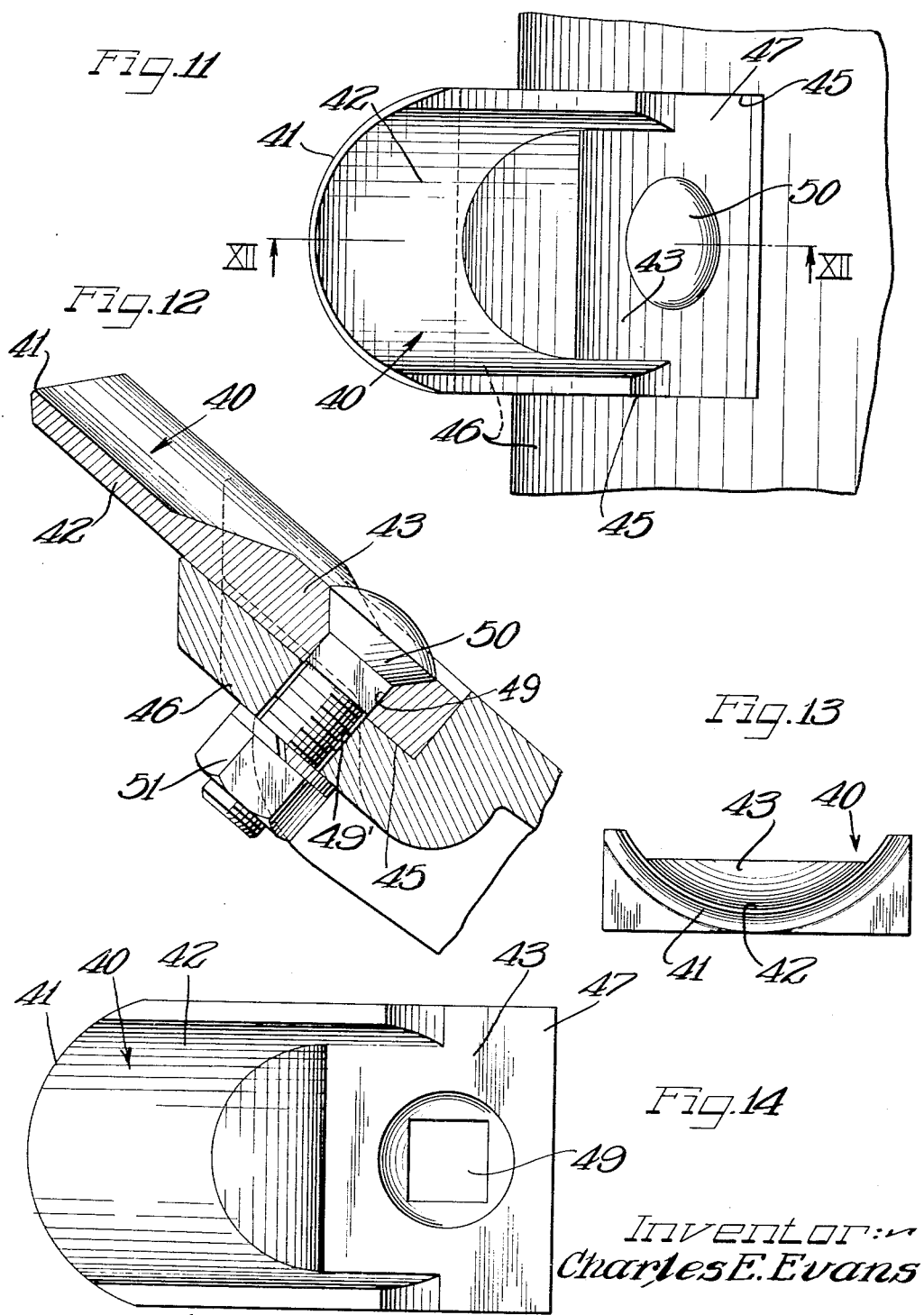

United States Patent Office 2,727,319
Patented Dec. 20, 1955

2,727,319

TOOTH FOR DIGGER BUCKET

Charles E. Evans, Naperville, Ill., assignor to Barber-Greene Company, Aurora, Ill., a corporation of Illinois Application March 27, 1951, Serial No. 217,856

9 Claims. (Cl. 37—142)

My invention relates to toothed diggers and more especially to teeth for detachable insertion in a forward edge portion of a bucket.

Heretofore, it has been customary in the digger art to provide the edge of a bucket with a plurality of sockets in which bucket teeth can be detachably held as by means of removable bolts. In such buckets the tooth sockets are spaced along the edge of the bucket. Also a diagonal socket on either or both corners of the bucket may be optionally used. If a diagonally located tooth is disposed at only one corner, the next succeeding bucket in the series of digger buckets will have the tooth in the opposite corner so that these corner teeth alternate in the series of buckets.

It is also common knowledge that in the use of such digger buckets, square end cutter teeth chip or wear off at the corners. In fact in the case of the diagonally located corner teeth they rapidly wear back, decreasing the cutting width of the bucket to a point that the ditch width is not enough to provide proper clearance for the bucket line and supporting boom.

In addition, the square end cutter teeth will cut a series of rectangular grooves in the face of the ditch which causes the sides as well as the front edge of the teeth to cut the material, thereby increasing the power consumption.

Further, due to strength requirements, the body of the tooth in a conventional tooth is so thick that as the edge wears back an additional thickness of metal is presented for cutting which requires more pressure and greater power for digging and also slows up the digging action.

Therefore, an object of this invention is to provide an improved digger tooth having a convexly curved cutting edge on the end of a concave-convex blade section which due to its form is relatively strong and as the edge wears back presents substantially the same thickness of metal at the cutting end of the tooth; the cutting action being done by the forward convex curved edge and not by the sides. Indeed the curved cutting edges of the teeth, when they are spaced on the forward edge of the successive buckets, freely remove the material or soil in the form of scallops with much less power.

A further object of this invention is to provide an improved digger tooth which in conjunction with its mating socket will be self-wedging.

Accordingly, I provided for use in a bucket tooth socket of curved cross-section, a digger tooth which may be of a number of different forms but each of which comprises a longitudinal element terminating in a blade of concave-convex curved cross-section with a convexly curved cutting edge at its outermost extremity; the blade section being of substantially uniform cross-section so that the cutting edge as it wears back, is not substantially thickened.

Another feature of the invention relates to providing an inner portion of the tooth element with a wedging or fastening portion having surfaces for wedging contact with portions of the bucket inside of the bucket tooth socket, whereby the tooth will frictionally adhere to the socket wall.

Another feature of my tooth is that it forms a stripper that promotes a scouring action and tends to deflect the material upward so that it is less liable to become packed in the bucket.

Other objects and features of this invention will more fully appear from the following detailed description taken in connection with the accompanying drawings which illustrate several embodiments thereof and in which:

Figure 1 is a plan view of a bucket having spaced curved sockets with digging teeth which embody the features of the invention;

Figure 2 is a cross-sectional view taken on substantially the line II—II of Figure 1, looking in the direction of the arrows;

Figure 3 is an enlarged end view of one of the sockets for receiving a digger tooth;

Figure 4 is a plan view of one of my digger teeth removed from the socket;

Figure 5 is an end view of the tooth shown in Figure 4 looking at it from its cutting end;

Figure 6 is a plan view of a modified form of tooth shown removed from the socket;

Figure 7 is an end view of the tooth shown in Figure 6 looking at it from its cutting end;

Figure 8 is a fragmentary view of a forward portion of a bucket showing my modified form of tooth mounted therein;

Figure 9 is an enlarged cross-sectional view taken on the line IX—IX of Figure 8;

Figure 10 is an end view of Figure 8 from the left hand side of same;

Figure 11 is a fragmentary view similar to Figure 8 but showing a still third form of tooth mounted in the socket;

Figure 12 is a sectional view taken on the line XII—XII of Figure 11;

Figure 13 is an end view of the tooth shown in Figure 11 from the left hand side; and Figure 14 is a plan view of this third form of tooth removed from the socket.

As shown on the drawings:

Referring to Figures 1 and 2 the reference character 10 designates generally a digger bucket which may be of any suitable construction with its forward edge provided with sockets of such construction that they will accommodate the digger teeth of this invention. This bucket, as shown, includes a bottom 11 and opposite sides 12—12; the bottom terminating in a forward edge portion 13 having spaced tooth socket portions 14, each of which is adapted to receive a digger tooth 15 embodying this invention.

In Figures 2 and 3, there is shown the construction of the socket portions 14 which are substantially identical; and hence a description of one will suffice for all.

Each socket portion 14 includes an elongated socket hole 16 which, on at least one side, is of concave-convex cross-sectional shape corresponding with the cross-sectional contour of the tooth 15 so that a tooth may be inserted endwise into such socket hole.

Also each socket portion has diametrically opposite projections or lugs 17—17 at the top side of the socket hole 16 and which on their undersides have surfaces 18—18 (Fig. 3) for tight or wedging cooperation with the teeth 15 (Fig. 2).

Each socket portion 14 has a hole 19 (Fig. 2) at its inner end into which the end of a suitable tool (not shown) may be inserted to tap loose or dislodge the tooth 15 when it is desired to remove the tooth.

Since all of the digger teeth 15 are identical and interchangeable, a description of one will suffice for all. The digger tooth 15 is best shown in Figures 2, 4 and 5. It will be noted that this digger tooth comprises an elongated element of concave-convex curved cross-section. The outer end of this element is formed into a relatively thin blade section 20 which terminates at its outermost extremity in a convexly curved cutting edge 21. Also it will be noted that the blade section is dished downwardly.

Now it will be appreciated that the retaining or socket hole 16 for each of the teeth 15 is generally of the same cross-sectional contour as that of the blade, at least the bottom wall 22 of the hole is curved so that when the blade is inserted therein the bottom of the blade rests on this wall. When in this position upper parallel edges 23—23 of the blade, at its inner end, are in resilient wedged engagement (Fig. 2) with the inclined inside surfaces 18—18 of the projections or lugs 17—17. In other words, the surfaces 18 are inclined outwardly away from the bottom wall 22 and in reality provide cam surfaces which progressively spring or wedge the side edges 23—23 of the blade as it is jammed into the socket. In this manner the inner end of the blade can be resiliently wedged in tight engagement with the walls defining the socket hole 16.

As noted before, if the tooth becomes badly worn or damaged so that it is no longer useable, it can be easily removed by inserting a tool in the hole 19 (Fig. 2) and by jarring or prying the tooth out of its wedged contact with the socket.

In Figures 6, 7, 8, 9 and 10, I have illustrated a second form of the invention wherein the tooth is designated generally by the reference character 25. This tooth, as in the case of the first form, is detachably insertable in a socket portion 26 (Fig. 8) in the forward edge 27 of a bucket bottom 28. The edge may, of course, be provided with any suitable number of these tooth sockets as in the preferred form of the invention. The socket portion 26 includes a curved bottom portion 30 (Figs. 9 and 10) which cooperates with the curved upper spaced segments 31—31 in defining a socket hole for receiving the curved tooth 25.

The curved bottom wall has a flattened wedge surface 32 which is cooperable with a flattened thickened portion 33 on the inside of the curved blade, Figures 6, 7, 8 and 9. In fact, the two surfaces 32 and 33 define cooperating inclined wedged surfaces which, when the tooth is inserted endwise in the socket, tightly wedges the tooth in the socket. The thickened surface portion 33 of the tooth may be recessed or cut out at 34 to reduce the area available for frictional contact with socket surface 32 if so desired. It will also be noted that the bottom surface 32 of the socket extends outwardly beyond the forward edge 26, as best shown in Figure 7, so as to back up and assist in the supporting of the curved bladed section.

Now in this form of the invention, as in the first form, the blade is channeled in the direction of its length and is of a convex-concave cross-section. It differs from the first form in that the convex portion of the blade is uppermost, whereas the blade in the first form is dished downwardly.

In the third form of the invention, illustrated in Figures 11 to 14 inclusive, the curved or bladed tooth is designated generally by the reference character 40. It differs principally from the previous forms in that it is held in place at its inner end by bolt means which forces the cooperating surfaces of the blade and socket into tight frictional engagement.

As in the other forms, the blade 40 is of a convex-concave cross-sectional shape, but particularly at its outer end, and terminates in a convexly curved outer cutting edge 41. The outer portion of this tooth is in the form of a channel, as indicated at 42, which blade portion 42 terminates in a thickened mounting portion 43 cooperable with a socket 45 in the forward edge 46 of the bucket.

In this instance the socket 45 is formed open at its top side. In other words, the socket merely comprises a recess in the top surface of the forward edge portion 46 of the bucket.

The thickened mounting end 43 of the tooth is generally squared as shown at 47 and is snugly fitted in a generally squared shaped opening 45 comprising the socket opening (Fig. 11). This thickened tooth portion 43 has a bolt receiving hole 49 through which the shank of a bolt 50 extends. The lower end of the bolt extends through a hole 49' in the socket portion and has threaded on its lower end, a nut 51 which upon tightening firmly clamps the thickened portion of the tooth in the squared socket 45 in the forward edge 46 of the bucket. In this manner the mating surfaces of the socket and tooth can be secured into tight frictional engagement with each other. In the addition, the fact that the socket 45 is squared and cooperable with the squared end 47 of the tooth enables the tooth to be held against turning. Turning can also be precluded by using a bolt with a squared shank as shown.

In the first two forms of the invention, once the tooth is inserted in the socket a slight pressure on its curved outer cutting edge will result in the tooth being frictionally bound or wedged against the cooperating surfaces of the socket. This arrangement is advantageous in that it permits of the tooth being self-positioning and self-clamping in the socket during the digging action. The sloping wedge surfaces provide for tight frictional load bearing contact between the tooth and the socket. In the third form of the invention any pressure against the cutting edge 41 tends to urge the tooth into tighter cooperation with the squared or shouldered socket, in the event that the shank of the bolt is not tightly engaged in the hole 49 in the tooth.

A very important feature of all forms of the invention relates to the convex curving of the cutting edge so that its medial portion is forwardmost and whereby there are no corners presented at the ends of the cutting edge such as would be present in a straight edge. This convex curving of the edge provides clearance at the ends of the edge for material or soil to flow freely as the same is cut and with less power. When a series of these teeth are used in spaced relationship, they will remove or cut the soil in the form of scallops which is especially advantageous in digging clay soil. In a gravel type of soil my novel curved tooth will approach in action a pick action.

In addition, when one of my curved teeth is set at an angle in the corner socket of the bucket, I find it cuts more freely than a squared or straight edge tooth and does not have any corners to wear off. Therefore, it maintains ditch width and proper clearance much longer.

It will also be clear that each tooth has an outer blade section that is relatively thin so that relatively little thickness is present at the cutting edge as it wears in continued digging. This is very important as these teeth of my invention have been found to require less pressure to be forced into the face of the cut, use less power when digging and also enable faster ditching action.

From the foregoing description it is evident that the concave side of the tooth may be located uppermost, although as in the second form it might be advantageous to form the bucket socket with its concave side lowermost so that the tooth can be uesd with its convex side uppermost in order to get a so-called rooting action.

The channeled construction of the outer blade end of the first and third forms of tooth in combination with the tooth support or socket, strips material from the tooth and thus minimizes packing in the bucket. This feature is evident from Figures 2 and 12 wherein it will be observed that the socket or tooth bottom retaining wall portion is below the top surface of the bucket bottom and wherein the channel in each tooth is arranged to guide the material upwardly over the forward edge of the bucket.

I claim as my invention:

1. For use with a bucket tooth retaining wall portion in the forward edge of a bucket and below the top surface of the bucket bottom, a digger tooth having one end snugly and detachably fitted in said wall portion and comprising an element having its other and outer end channeled and formed into a concave-convex curved thin blade with a convexly curved outermost cutting edge whereby a substantially uniform thin cutting edge is constantly presented as said edge wears back in digging, the tooth channel defining a path whereby the material as it is stripped, is freely guided up over the forward bucket edge onto the bucket bottom surface and whereby packing of the stripped material is minimized.

2. As an article of manufacture, a tooth for insertion in a tooth socket in a bucket and comprising an element having one end formed into a relatively thin blade portion of concave-convex channeled cross-section terminating in an outer extremity formed into a convexly curved forward digging edge, said blade portion terminating at its sides in spaced flattened socket engaging surfaces and said blade portion being relatively thin and resiliently stressable when the tooth is pressed into a bucket socket.

3. For use in a bucket tooth socket the opening of which is of generally curved cross-section, a digger tooth insertable endwise in the socket and having a concave-convex cross section corresponding generally with that of the socket and including an outwardly projecting thin blade portion of substantially uniform thickness terminating in an extremity formed into a convexly curved digging edge, the sides of said thin blade portion terminating in spaced edges effecting progressive wedging engagement with spaced portions of the wall of the socket.

4. In combination with a bucket tooth socket defined by spaced walls, a digger tooth telescoping endwise the socket between said walls and comprising a concavely channeled element having one end formed into a concave-convex curved thin blade of substantially uniform thickness so that a thin cutting edge is constantly presented as said edge wears back in digging, said thin blade terminating at its sides in flat wedge surfaces and said spaced walls of the socket being inclined permitting progressive and tight wedging engagement with said tooth wedged surfaces as the tooth is inserted in the socket.

5. In combination with a bucket tooth socket defined by spaced walls, a digger tooth telescoping endwise the socket between said walls and comprising a concavely channeled element having one end formed into a concave-convex curved thin blade of substantially uniform thickness with a convexly curved cutting edge whereby a substantially uniform thin cutting edge is constantly presented as said edge wears back in digging, said blade having an intermediate thickened portion in the channel of the blade for wedged engagement with the wall of the socket and said wall of the socket being inclined for progressive wedging engagement with the thickened portion as the tooth is inserted in the socket.

6. In combination with a bucket tooth socket defined by a plurality of walls, a digger tooth having one end mounted in said socket for tight engagement with said walls and comprising a concavely channeled element having its outer end formed into a concave-convex curved thin blade of substantially uniform thickness with a convexly curved cutting edge, said other end of the tooth being thickened and snugly fitted in said socket and transverse detachable means for fastening the tooth to the socket and for holding it in tight frictional engagement with said socket walls.

7. As an article of manufacture, a bucket digger tooth of the socket supported type comprising a longitudinally channeled member of generally concave-convex cross section having at one end a curved concave cutting edge, said member having at least at its other end a socket engaging wedge surface retainingly cooperable with a similar surface when mounted on the edge of a digger bucket.

8. In combination in a digger bucket structure including a bucket having a bottom terminating in an edge provided with a multiple of spaced tooth receiving sockets and a tooth for each socket comprising a longitudinally channeled member of generally concave-convex cross section having at one end a curved concave cutting edge and having at its other end a socket receiving edge portion, said ends having between them parallelly aligned longitudinally tapered edges with the channel therebetween, said channeled member defining a trough for conducting dug material toward and above said tooth sockets, each of said tooth sockets having a concavely formed tooth supporting wall for telescopingly receiving lengthwise said channeled tooth and internally inclined shoulders complementary to the tapered edges of said tooth and against which said edges are wedged when the tooth is inserted into said socket opening.

9. A digger bucket tooth comprising a longitudinally channeled member of relatively thin concave-convex cross section having opposite end portions, one of said end portions having a rounded cutting edge with the other end shouldered and having a relatively flat mounting edge, said member having longitudinally extending parallelly aligned flat edges with the channel therebetween, said channel member defining a trough for conducting the material away from the cutting edge and onto the bucket bottom.

References Cited in the file of this patent

UNITED STATES PATENTS

| | | |
|---|---|---|
| 265,288 | Stonesifer | Oct. 3, 1882 |
| 1,258,109 | Goeldner | Mar. 5, 1918 |
| 1,421,346 | Seyms | June 27, 1922 |
| 1,522,860 | Boots | Jan. 13, 1925 |
| 1,631,941 | Straits | June 7, 1927 |
| 1,769,998 | Jenkins | July 8, 1930 |
| 1,870,044 | Fellmeth | Aug. 2, 1932 |
| 1,885,326 | Brune | Nov. 1, 1932 |
| 2,034,490 | Schnack | Mar. 17, 1936 |
| 2,041,806 | Bartol, Jr. | May 26, 1936 |
| 2,114,129 | Younie | Apr. 12, 1938 |
| 2,167,425 | Page | July 25, 1939 |
| 2,256,488 | Murtaugh | Sept. 23, 1941 |
| 2,353,685 | Askue | July 18, 1944 |

FOREIGN PATENTS

| | | |
|---|---|---|
| 118,488 | Australia | May 4, 1944 |
| 448,676 | Great Britain | June 12, 1936 |